June 22, 1954 — W. M. HARCUM — 2,682,042
TACTUAL SIGNAL DEVICE
Filed Dec. 1, 1950 — 4 Sheets-Sheet 1
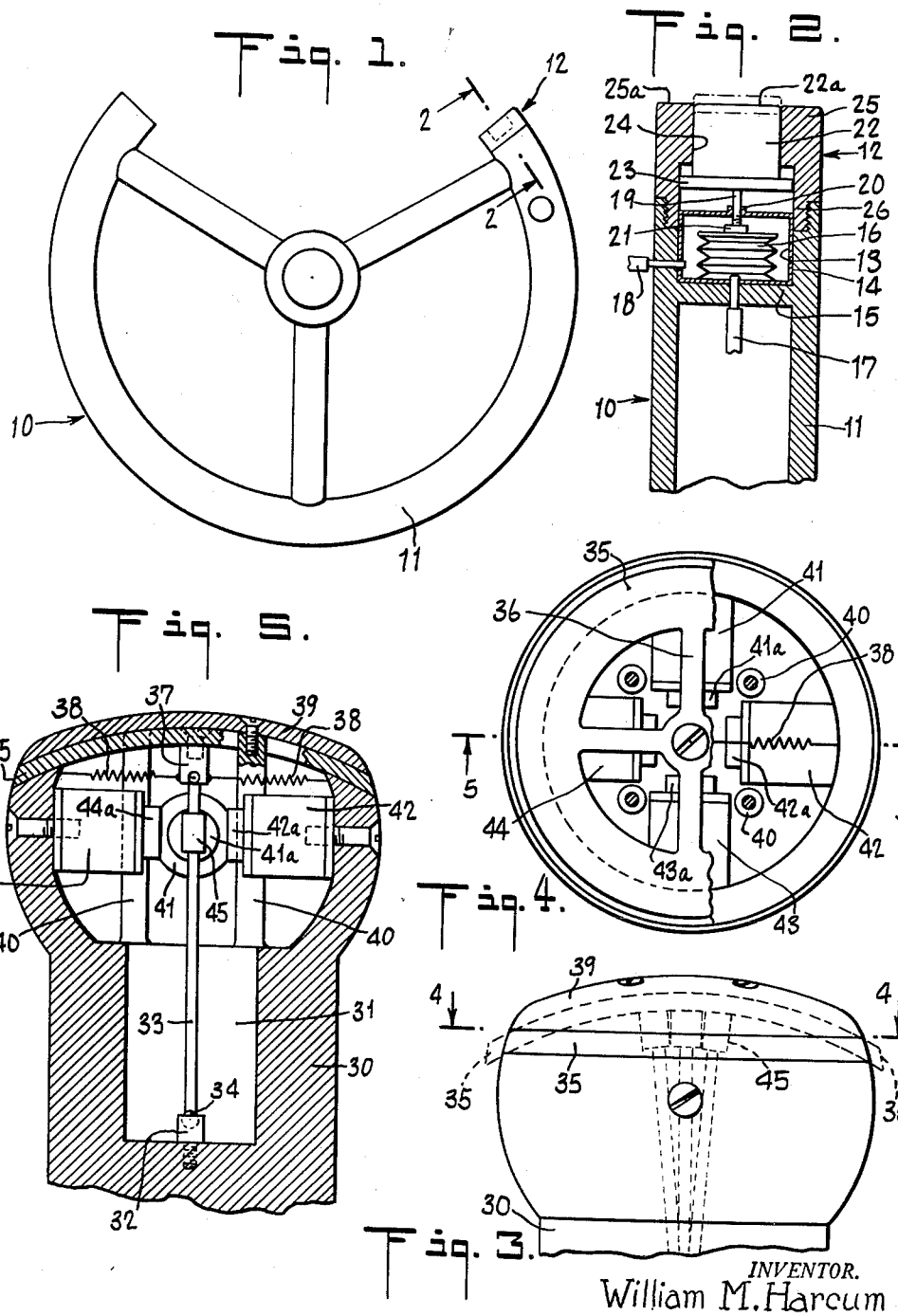
INVENTOR.
William M. Harcum
BY Kenyon & Kenyon
ATTORNEYS

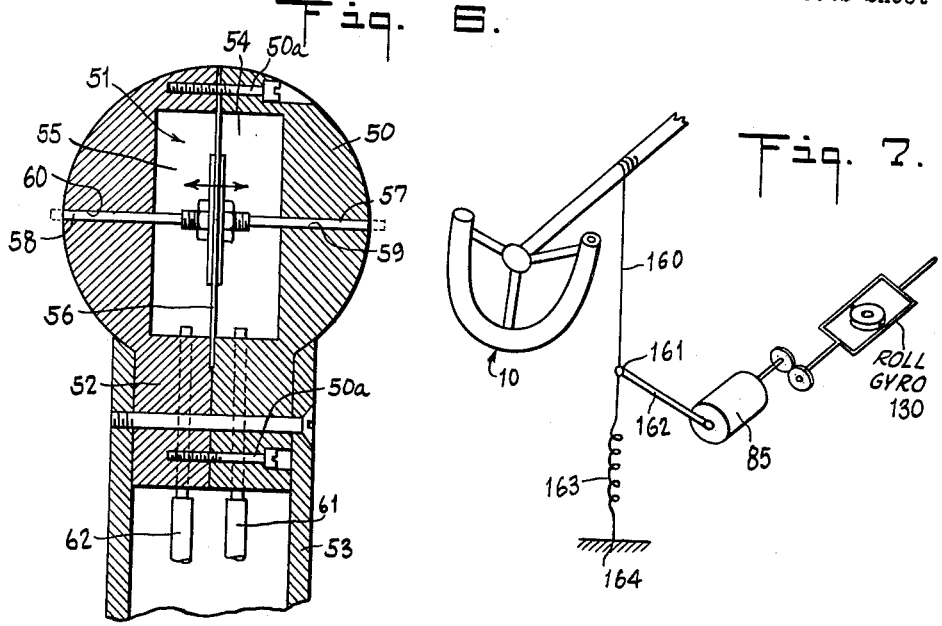
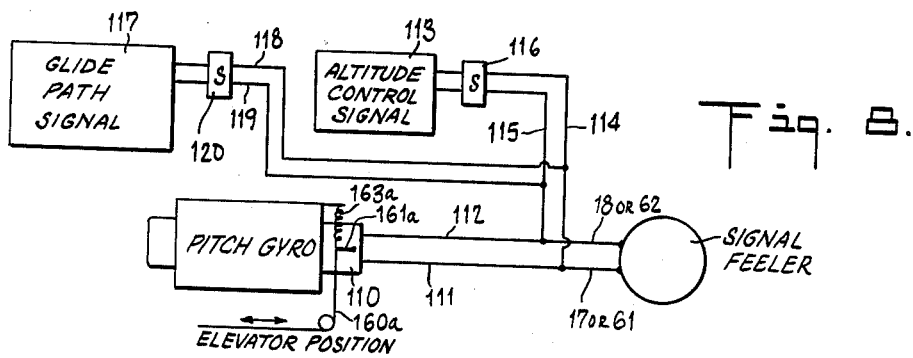
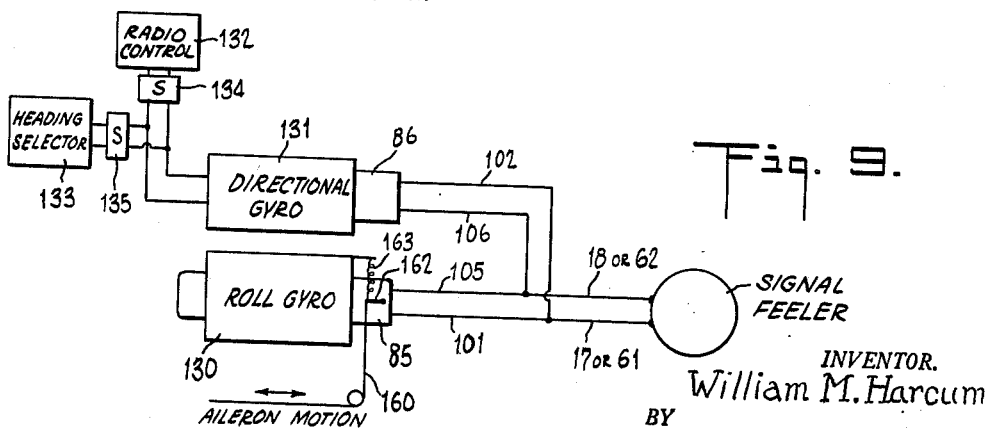

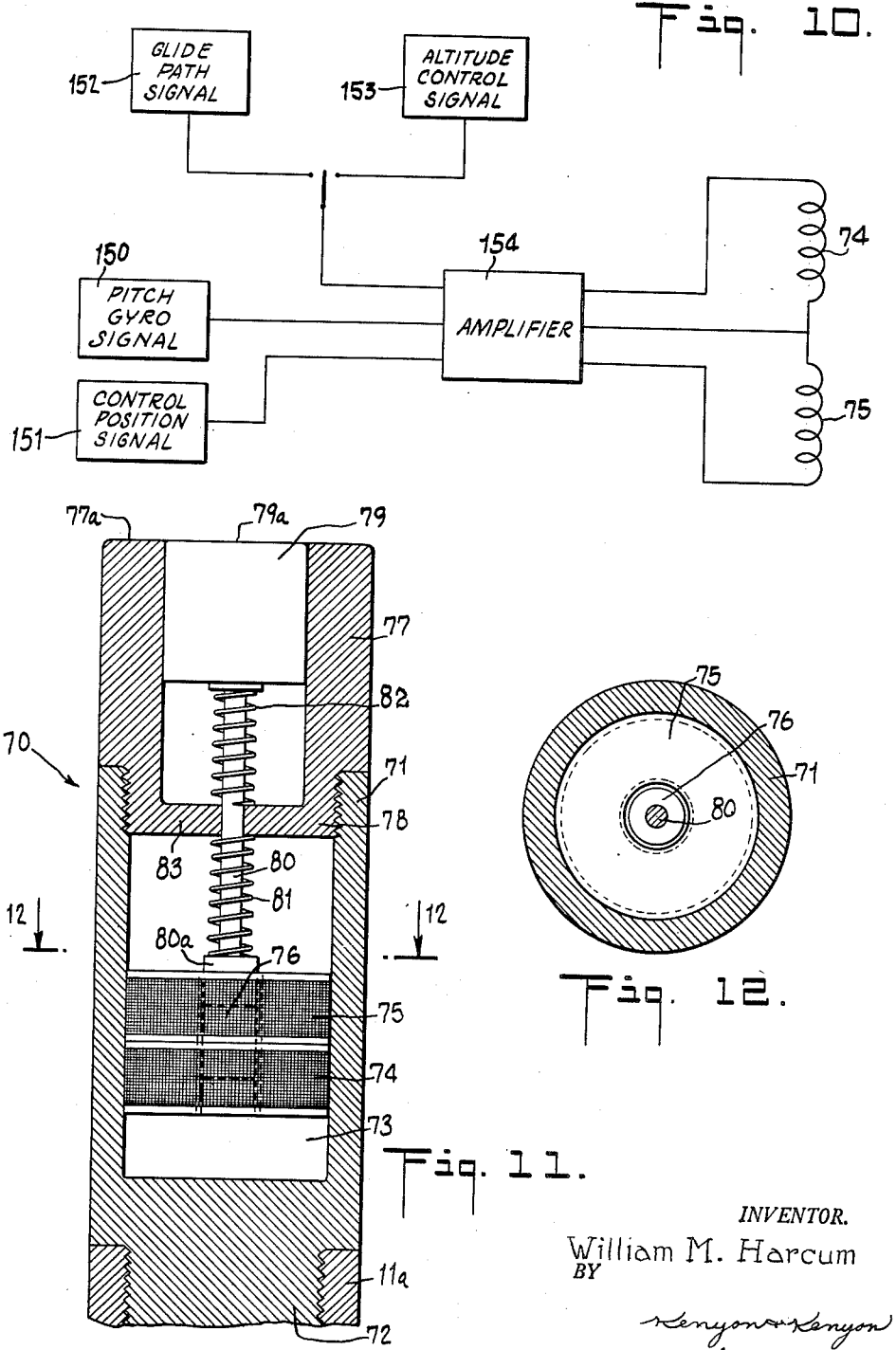

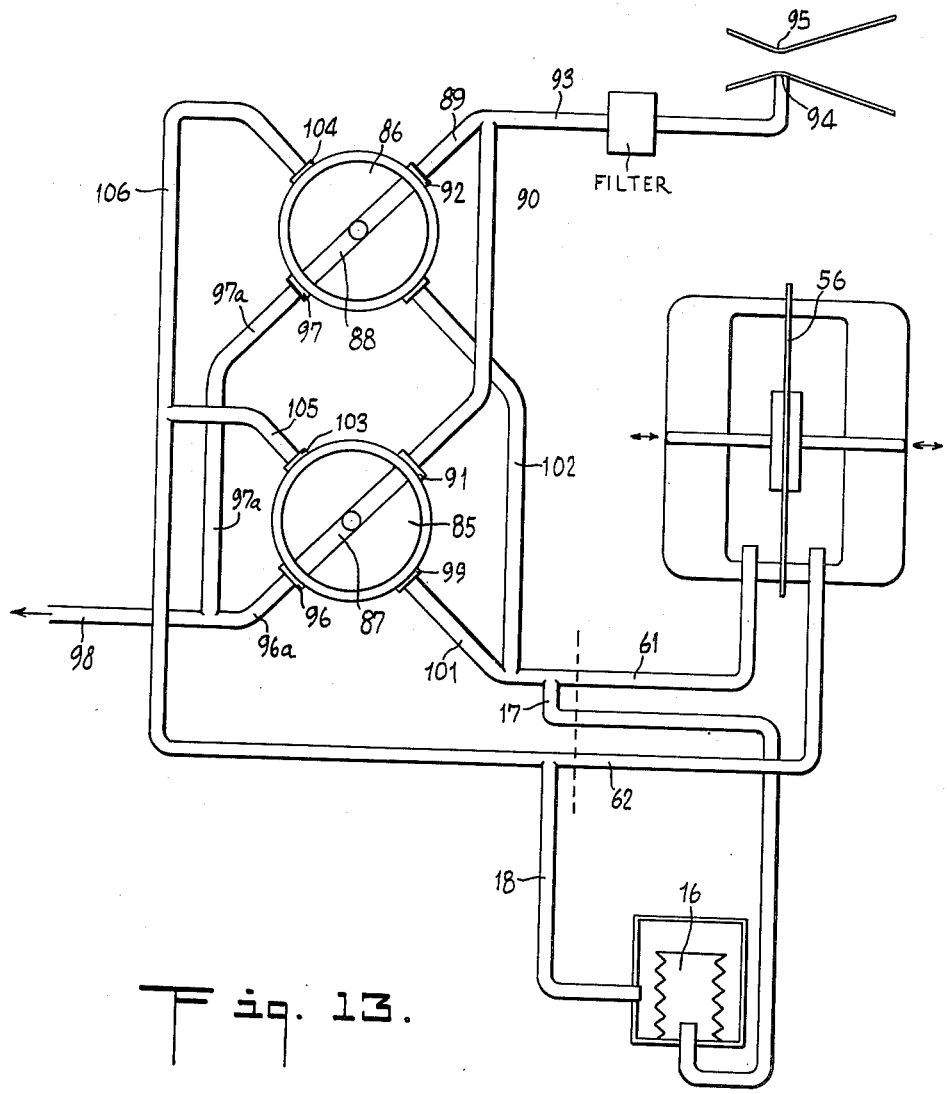

Patented June 22, 1954

2,682,042

UNITED STATES PATENT OFFICE 2,682,042

TACTUAL SIGNAL DEVICE

William M. Harcum, Bryn Mawr, Pa., assignor to Tactair Inc., Philadelphia, Pa., a corporation of Delaware Application December 1, 1950, Serial No. 198,519

7 Claims. (Cl. 340—27)

This invention relates to navigational instrument devices and more particularly to indicator instruments whereby a pilot or navigator can obtain all the necessary flight or navigation instrument indications by a sense of feel rather than a visual instrument reading and can move controls to follow this feel by almost automatic reaction in a corrective manner. More broadly, it relates to signal feeler devices which provide feel signals to an operator derived from detection of an operating condition or conditions whether of flight, of navigation or of a machine or industrial process which will cause the operator by reference to the feel signal rather than a visual or audible one to make correction in operating conditions either to restore original correlations or to maintain a selected condition or selected conditions.

Among the objects and features of the invention are the provision of signal feeler devices intended to impart information to a pilot or operator of operating conditions of a machine, airplane, or other vehicle by a feel as contrasted with visual or audible signal-imparting devices.

Other objects and features of the invention are the provision of effective and simply operated signal feeler devices that are capable of installation and of use with detecting or measuring devices now extinct.

Further objects and features of the invention are the provision of signal feeler devices or instruments that will be effective for the intended purposes and which may be utilized independently of other instruments or in conjunction therewith so that upon failure of the said other instruments control may be effectively maintained by the use of the signal feeler devices.

While the invention as hereinafter described will be with reference particularly to its application for use with aircraft, it is to be understood distinctly that the broader aspects of the invention and its application to other situations as hereinbefore outlined are distinctly contemplated.

Further specific features and objects of the invention are the provision of signal feeler devices as an auxiliary instrument for flight instrument let-downs. During the crucial period, it is necessary to have an instrument such as a signal feeler of the invention which will relate to the pilot in the simplest possible terms the control motions required for flight.

Further objects and features of the invention are to provide devices of the character in question that will make flying more pleasant and serve to make emergency instrument flight easier for those pilots who are not so-called instrument pilots.

Further objects and features are to provide feel instruments for simple flight control of military aircraft, allowing a fighter pilot, for example, more freedom of effort for flight planning and navigation, or to provide flight control of military craft in response to fire control or bombing computor signals, or to exercise maneuvers or control motions more precisely particularly in flight testing.

Further objects and features of the invention are to provide signal feeler devices that are light in weight, simple in detail, reliable as compared with servo installations and effective as standbys where servo installations are used on failure of the latter as well as signal feeler devices that may be used effectively for flight training purposes.

Other objects and novel features of the invention will become apparent from the following specification and the accompanying drawings, wherein:

Fig. 1 is a plan view of a navigational control wheel equipped with one form of signal feeler;

Fig. 2 is a sectional view on an enlarged scale taken along line 2—2 of Fig. 1 of the signal feeler of Fig. 1;

Fig. 3 is a fragmentary elevational view of another form of navigational control equipped with a second form of signal feeler;

Fig. 4 is a sectional view taken along line 4—4 of Fig. 3 illustrating details of construction;

Fig. 5 is a section taken along line 5—5 of Fig. 4 illustrating additional details of construction.

Fig. 6 is a vertical section of the handle end of a control equipped with a further modified form of signal feeler;

Fig. 7 is a diagrammatic perspective view of the signal feeler arrangement of Fig. 1 provided additionally with a control position follow-up arrangement;

Fig. 8 is a diagrammatic showing of a pneumatic system wherein various flight signals are added before reaching the signal feeler;

Fig. 9 is a diagrammatic showing of a pneumatic system wherein the various flight signals are added before reaching the signal feeler so that the latter gives bank angle signals proportion to heading error;

Fig. 10 is a diagrammatic showing of an electrical system in which various flight signals are added electrically before reaching an electrically operated signal feeler;

Fig. 11 is a sectional view of an electrically operated signal feeler;

Fig. 12 is a plan view of the feeler end of the device of Fig. 11; and

Fig. 13 is a diagrammatic showing of elements of a pneumatic system.

Referring to the drawing, and first to Figs. 1 and 2, 10 denotes a condition control device such as a control wheel of an airplane of conventional type, in which as shown the hand grip 11 is an incomplete circle or arc. A signal feeler 12 embodying the invention is mounted at one end of the arcuate hand grip portion.

This signal feeler as shown in Fig. 2 comprises a closed casing 13 which is inserted in a hollowed-out portion 14 at one end of the hand grip 11 resting on the partition or shoulder 15 therein. A bellows 16 is mounted internally of the casing 13 and communicates at one end with a pneumatic conduit 17. The casing 15 communicates with a pneumatic conduit 18 so that the bellows 16 will expand or contract in accord with differentials of pressure on its outer and inner surfaces as controlled by pneumatic pressure through conduits 17 and 18. A feeler operating rod 19 extending in leakproof relationship through an opening 20 in the container 13 is threadedly secured at 21 to the bellows 16 for axial movement as determined by expansion and contraction of the bellows. A feeler knob or pin 22 is secured to the outer end of rod 19 for axial movement corresponding to that of said rod. The body of the knob or pin 22 fits slidably in the bore 24 of a cap 25 whose nipple 26 is threadedly secured in the end of grip 11.

The bellows 16 is spring-biased normally to maintain the outer surface 22a of the pin or knob 22 flush with the top surface 25a of cap 25. Contraction and expansion of the bellows 16 as determined by the pressure conditions in pneumatic conduits or pressure lines 17 and 18 causes corresponding movement of the surface 22a below or above the plane of surface 25a to an extent determined by the relative pressure conditions in the two conduits 17 and 18. Thus, the extent of displacement which is felt by application of the pilot's finger over the surfaces 22a and 25a affords a quantitative signal of the necessary corrective movement he is required to apply to control surfaces of the aircraft to return it to optimum flying conditions.

The pneumatic conduits 17 and 18 which may be flexible hose, are connected to gyroscopically-controlled pressure systems whereby the pressure conditions in conduits or lines 17 and 18 reflect deviations from normal flying conditions. Appropriate gyroscopically-controlled systems will be hereinafter described. The pressure conditions in lines or conduits 17 and 18 can be made responsive to a plurality of flying conditions so that the feel positions of surfaces 22a will represent a summation of deviations from a plurality of flying conditions. Thus, for example, the pressure conditions in conduits 17 and 18 can be the summations or resultant of independently-controlled signals of glide path deviations, of altitude deviations and of pitch deviations, or of heading and of roll.

A more elaborate feel device which will cause movement of a feel member in a direction which is the resultant of several changed conditions and deviations and give the pilot a feel sensation more closely indicative of a number of changed conditions or deviations is shown in Figs. 3–5 inclusive.

In these figures the knob end of the joy-stick 30 or other control element of the aircraft is provided with a large cavity 31. A ball socket 32 is secured at the base of the cavity and bears an axially extending rod 33 having a ball end 34 fitting the socket 32, so that the rod 33 may swing in any angular direction in the socket 32. A ring member 35 carried by a spider 36, the latter bearing a socket 37, is secured to the opposite end of rod 33. The periphery of ring 35 is dimensioned so that in centered position of rod 33, when it is coaxial with the axis of joy-stick 30, the surface of ring 35 lies flush with the surface of the knob end of said stick at all places. Biasing springs 38 secured to the socket 37 and to fixed positions in the wall defining cavity 31 act normally to maintain the centered position of ring 35. Thus the pilot is unable to feel the ring 35 when it is centered. A cover cap 39 secured to posts 40 arranged in the cavity 31 overlies the ring 35 and conceals its presence, also acting as a protection for the operative parts in said cavity.

A set of radially disposed electro-magnets 41, 42, 43, 44 are mounted in the cavity 30 with their magnetic cores 41a, 42a, 43a, 44a equi-spaced and facing inwardly. An armature piece 45 in this instance of substantially cylindrical shape is positioned on the rod 33 at the level of the cores 41a, 42a, 43a, 44a. The coils (not shown) of the electro-magnets at 41, 42, 43, 44 are connected electrically to receive individual electric signals from individual flight instruments, for example, a roll gyro, a directional gyro, a pitch gyro and a glide path signal device. The strength of signal received by any one of the electro-magnets 41, 42, 43 or 44 determines the magnetic attraction towards its core 41a, 42a, 43a or 44a. Since the rod 33 is free to pivot in the ball socket 32, the relative position of rod 33 with respect to the four cores 41a, 42a, 43a and 44a is one which is the resultant of the four attractive forces effected by the four separate cores. In consequence, the periphery or outer surface of ring 35 moves in a corresponding direction to a corresponding position where a portion of it protrudes beyond the side surface of the knob end of the stick 30 and can be felt by the pilot. The extent of displacement and its direction serve as an indication to the pilot of the necessary corrective action to be applied to the joy-stick.

In Fig. 6 a further modified form of signal feeler construction is shown. This construction includes a ball-shaped knob 50 having a cavity 51 and a cylindrical insert part 52 adapted to fit the outer end of a tubular joy-stick 53. The cavity 50 is divided into two compartments 54 and 55 by a diaphragm 56. A pair of oppositely extending pins 57, 58 are secured suitably to the diaphragm and fit slidably and in substantially leakproof manner in the oppositely located holes 59, 60 in the knob 50. The pins 57 and 58 are so dimensioned that in normal unflexed condition of the diaphragm 56 both have their outer ends lying preferably flush with the outer surface of knob 50. For convenience in assembly, the knob 50 is made in two parts joined together as by the bolts 50a. Compartment 54 communicates with a pneumatic conduit or pressure line 61 and compartment 55 communicates with a pneumatic conduit or pressure 62. These conduits are adapted for connection to gyroscopically-controlled pressure systems whereby the pressure conditions in conduits 61 and 62 are responsive to a given set of flying conditions and consequently the pressures in compartments 54 and 55 are similarly responsive so that the diaphragm 56 is flexed either in one direction or the other causing corresponding longitudinal movements of pins 57 and 58 so that one or the other protrudes from the outer surface of knob 50 and can be felt by the pilot. The extent of protrusion and the particular pin protruding imparts a feel signal to the pilot's hand indicating the need for a corrective motion of the joy-stick 53 and also, the extent and direction of such corrective motion.

Figs. 11 and 12 illustrate a further modified form of signal feeler construction similar in many respects to the construction of Figs. 1 and 2 but designed for electrical rather than pneumatic operation. In Figs. 11 and 12, the signal feeler 70 comprises a body 71 adapted to be secured by a threaded nipple 72 to an end of the hand grip 11a. The body 71 has a tubular cavity 73. A pair of electromagnetic coils 74, 75 are appropriately secured in the cavity 73. A core 76 of magnetic material is disposed axially of the two coils 74, 75 and movable reciprocally in the axial direction of the coils. This core is shorter in length than the axial length of the two coils and in neutral position is centered relative to the axial lengths of both coils. A tubular knob 77 having a threaded nipple 78 is screwed into the outer end of the tubular body 71. A feeler pin 79 is slidably guided in the tublar knob 77. A feeler-operated rod 80 preferably of non-magnetic material is secured at one end to the pin 79. The rod 80 has an enlarged portion 80a which is secured to the core 76. Oppositely acting biasing springs 81, 82 are arranged on the rod 80 respectively between the enlarged portion 80a and one side of wall portion 83 of knob 77, and the other side of the wall portion 83 and the pin 79. These springs 81, 82 are adjusted to position the pin 79 so that in the unactuated condition of both of coils 74 and 75, the upper or outer surface 79a of pin 79 lies flush with the upper or outer edge 77a of knob 77 while the core 76 lies centralized relative to the axial length of the two coils 74 and 75. When electric currents are sent through the two coils 74, 75 in opposite directions and of different intensities, the resultant oppositely acting different magnetic fields of the two coils will effect an axial movement in one direction or the other of the core 76 relative to the coils and consequently move pin 79 in or out relative to surface 77a. The extent of displacement of pin 79 from its neutral position will be in response to the resultant of forces of the two oppositely acting magnetic fields which is a differential force which is the vector difference of the forces of the two oppositely acting magnetic fields on the core 76.

*Pneumatic systems*

Pneumatic systems for controlling pressure in the conduits 17 and 18 of Fig. 2 or 61, 62 of Fig. 6 are illustrated diagrammatically in Figs. 8, 9 and 13.

Referring first to Fig. 13 a pair of independently operable four-way valves 85, 86 each having a movable vane 87 or 88 have pressure lines 89, 90 connected respectively to the inlet ports 91, 92 of the two valves. A pressure conduit 93 connected to the throat 94 of a Venturi tube 95 provides a common pressure source for the two valves. Outlet ports 96, 97 positioned diametrically opposite the respective ports 91, 92 are connected by conduits 96a, 97a, to a common conduit 98 leading to atmosphere. When the vanes 87, 88 are centralized relative to the pairs of inlet and outlet ports 91, 94 and 92, 95 of the two valves 85, 86, pressure conditions in the valve cylinders on both sides of the vanes 87, 88 are balanced. Vane-controlled outlet ports 99, 100 of the respective valves 85, 86 are connected respectively by conduits 101, 102, either to the pressure line 17 or 61. Similar outlet ports 103, 104 of the respective valves 85, 86 are connected respectively by conduits 105, 106 to the pressure line 18 or 62. Conduits 103, 104, 105, 106 are conveniently termed vane-controlled pressure or pneumatic conduits because pressure existing therein depends upon the position of the respective vanes 87, 88.

With the vanes 87, 88 in neutral position as shown in Fig. 13, i. e., centralized relative to the pairs of ports 91, 94 and 92, 95, uniform pressure appears in the pressure lines 17 or 61 and 18 or 62. In consequence, pressure on both sides of bellows 16 or of diaphragm 56 is uniform and feeler knob 22 or feeler pins 57, 58 lie in their described neutral positions and cannot be felt by the pilot. Any change in the position of either of the vanes 87 or 88 unbalances the net pressure appearing in the pressure lines 17 or 61 and 18 or 62 thereby causing either expansion or contraction of bellows 16 or a flexing of diaphragm 56 in one direction or the other with corresponding movements of the feeler knob 22 or feeler pins 57, 58 to provide feel conditions for the pilot that impart knowledge of a flight deviation to him causing him to make corrective movement of the aircraft control element in appropriate direction and extent until the balanced or neutral "no feel" position of the described feel elements is restored.

The vanes 87 and 88 are independently operated by appropriate measuring or sensing elements for instruments, for different flight parameters. For example, vane 87 may be operated in conventional manner by a roll gyro (Fig. 9) while vane 88 may be operated by a directional gyro (Fig. 9).

In Fig. 8, the pressure lines 17 or 61 and 18 or 62 which actuate a feeler of the type shown either in Fig. 2 or in Fig. 6 are shown as supplied by controls responsive to three flight parameters. In this instance, the pitch gyro-controlled valve 110 which is similar in construction to the valves 85 or 86 has its vane-controlled pneumatic conduits 111, 112 (corresponding to conduits 101 or 102) connected to the respective pressure line, 17 or 61 and 18 or 62. Similarly, an altitude control signal operated valve 113 of similar construction has its vane-controlled pneumatic conduits 114, 115 connected to the respective pressure lines 17 or 61 and 18 or 62. A cut-out valve 116 in lines 114, 115 permits the pressure system controlled by valve 113 to be cut into or out of operation as desired. Likewise, a glide path signal operated valve 117 of similar construction as valves 85 or 86 has its vane-controlled pneumatic conduits 118, 119 connected to the respective pressure lines 17 or 61 and 18 or 62. A cut-out valve 120 in lines 118, 119 permits the pressure system and pressure signals from valve 117 to be cut into or out of operation as desired. Each of the valves 110, 113 and 117 are similar to valves 85, 86 of Fig. 13 and each has a vane or operating member (not shown) actuated by one of these parameter responsive elements which may respectively be a pitch gyro which operates the vane (not shown) of valve 110, an altitude measuring device whose movable elements act electrically or mechanically in conventional manner to operate the vane (not shown) of valve 113, and a glide path signal responsive element whose response means also acts mechanically or electrically in conventional manner to operate the vane (not shown) of the valve 117. When switch valves 116 and 118 are opened to allow pressure to appear in the pneumatic conduits 114, 115 and 118, 119, the pressure appearing in the respective pressure lines 17 or 61 and 18 or 62 is the net sum of the separately controlled pressures in the three pairs of lines 111, 112 and 114, 115, and 118, 119 and the differential of the two net pressures in the lines 17 or 61 and 18 or 62 determines the extent and direction of displacement of the pressure-actuated feeler elements of Figs. 2 or 6 hereinbefore described of the particular signal feeler to which said lines are connected.

Fig. 9 shows essentially the system of Fig. 13 in which the vane 87 of roll gyro-operated valve 85 is operated mechanically by the roll gyro 130 and the vane 88 of the directional gyro is operated mechanically by the directional gyro 131.

Either pressure line 17 or 61 of the selected signal feeler of Fig. 2 or 6 is connected with the pressure lines 101, 102 from the valves 85, 86, 87, 88 while either pressure line 18 or 62 is connected with the pressure lines 105, 106 from the valves 85, 86, 87, 88. An additional feature in Fig. 9 is control of operation of the directional gyro in response to radio controls 132 or heading selector controls 133 of conventional construction. As with Fig. 8, the pressure conditions in pressure lines 17 or 61 and 18 or 62 is the net sum of the pressure in the two pairs of lines 101, 105 and 102, 106, and the differentials of the two net pressures in the lines 17 or 61 and 18 or 62 determines the extent and direction of displacement of the pressure-actuated feeler elements hereinbefore described of the signal feeler to which such lines are connected.

As with Fig. 8, cut-out switches 134, 135 function to cut the radio control and heading selector in and out of operation relative to the directional gyro 131.

While responsiveness to three parameters are shown in Fig. 8 and to two parameters in Fig. 9, it is to be understood that the selected signal feeler can be made responsive to more or fewer parameters as conditions require. Likewise, one of the parameters could be a rudder control responsive device instead of a pitch, a roll or a directional gyro.

*Electrical systems*

Fig. 10 illustrates diagrammatically an electrical system for energization of coils 74 and 75 in response to a set of parameters which in this instance involve a pitch gyro control generator 150, a position control signal generator 151 and optionally either a glide path signal generator 152 or an altitude control signal 153. The outputs of the generators are amplified in an amplifier 154 which also separates the signal current intended to energize coil 74 from that intended to energize coil 75. In either event the electric current for energizing each coil consists of a summation of independent signals reaching the desired output terminal of the amplifier.

The electro-magnetic fields developed in coils 74 and 75 are arranged to act in opposition so that the displacement of core 76 relative to the two coils 74 and 75 is the differential resultant of the actions of the opposing electro-magnetic forces generated by coils 74 and 75 which causes corresponding movement of the feeler plunger 79 relative to its described neutral position thereby providing feel condition to the pilot indicative of the extent and direction of necessary corrective movement of the control element.

As with the pneumatic systems, fewer or large numbers of parameters may be provided whose signals are added in the amplifier 154 and delivered from its output terminals to the appropriate coils 74 and 75, or if more coils are present as for example the coils of the electro-magnets 41, 42, 43 and 44 of Figs. 4 and 5 to appropriate ones of such coils.

*Position follow-up*

The pneumatic and electrical systems for operating the various signal feelers hereinbefore described do not include a position follow-up arrangement and hence the feel imparted to the pilot is recognition by feel of the airplane error, for example, in bank angle or pitch angle in much the same way as he would recognize such error by visual observation of indicators on corresponding instruments on the instrument panel e. g., the real or artificial horizon as regards banking or pitch indicator as regards pitch. In consequence, his movement of the control element of the plane is an amount in appropriate direction which he has previously learned is enough to correct a given bank angle or pitch angle and as the airplane again approaches a level position he reduces this corrective movement to zero or even reverses it in order not to overshoot. The bank angles or pitch angle feel without position follow-up is only an indication of an error condition. More mental computing and experience are required before the correct sequence of corrective movements is applied.

The application of a position follow-up arrangement between the control element of the plane and pick-off indices of bank aileron or pitch elevator control surfaces, results in different conditions. Thus zero signal or no feel condition at the signal feeler occurs not only at zero bank angle or zero pitch but generally at any time with aileron deflection or elevator deflection exists proportional to bank angle or pitch angle errors.

A control position follow-up arrangement for bank angle is shown schematically in Fig. 7 and more diagrammatically in Fig. 9. The arrangement comprises simply a string, flexible cable or cord 160, one end of which is wound around and fixed to the rotatable shaft of the control member 10 which operates the ailerons so that it can wind and unwind from the said shaft when the latter is rotated. The other end of the cord 160 is secured at 161 to the aileron pick-off index arm 162. The arm 162 is secured to rotate the same amount on the axis of and in the same direction as, for example, valve vane 87 (Fig. 13) of valve 85. A biasing spring 163 is secured at 161 to the arm 162 and cord 160 and at 164 to a fixed part. The spring 163 acts to keep the cord 160 taut and insures its unwinding when the control wheel is rotated in unwinding direction.

Since the aileron control follow-up cable or cord 160 is geared directly to the index or outer gimbal of the roll gyro pick-off 130, the pilot is compelled to apply an amount of aileron deflection proportional to the angle of departure from level flight. Since the vane 87 rotates the same amount, a signal at the feel device, namely, a feel of the feeler element 25 or one of the two pins 57 or 58 means that the aileron then is in error from its intended position corresponding to the particular bank angle present. In such event, the correct direction of control indicated to the pilot is always in the same direction as the pressure felt at the pins of the feel device. Hence, the pilot applies corrective movement to the control 10 to cause the feel to disappear. It is not necessary to learn or to remember to move the aileron control ahead of the signal. It is only necessary to "follow the feel" until zero signal is established. Then, the aileron will always have been moved correctly.

Similar position follow-up for pitch is shown schematically in Fig. 8 wherein the cord 166a connected directly to the pitch control member and the pick-off arm 161a of the pitch gyro acts to produce similar relative movements of the vane 88 of the pitch valve 86. Again, the elevator, as a result, is moved by following the feel until zero pitch signal is established at the signal feeler.

The provision of the position follow-up means whether the signal feeler is used for aircraft, other vehicles or for industrial control purposes provides an instrument which provides signals which are functions both of the position of the controlling means or device and of the parameter or parameters to be controlled. With such position follow-up there is provided an arrangement of measuring instruments for various parameters and any necessary computers performing operations as a result of measurements and of information regarding the position of the control means or device which effects the feel imparting member of the feel signal to cause it to move to indicate error in position of the control device from the selected position intended for best control as determined by the measuring instruments and any computers. The feel imparting member is responsive then to instruments or devices measuring error from desired conditions and is also responsive to the condition of the controlling device, and operates in such a way that the intended control mode is most efficiently carried out by chasing the feel imparting member to zero feel with the control device.

It is recognized that when the signal feelers either electrically or pneumatically controlled are made responsive to more than one flight parameter, depending upon mechanical limitations of the instrumentalities employed that the pressure or electrical signals from one such parameter, if added directly with those of the other parameters, may provide a masking effect because of materially greater strength so that the resultant feel signal is not truly representative of actual conditions.

For example, with one type of roll and directional gyro of known design where the roll or bank parameter signals had added thereto pneumatically air-plane-heading signals to provide a differential pressure signal at the feeler proportional to the error between actual and index heading as well as one proportion to the bank angle, the direct connection of the pressure signals denoting error between actual and index heading to the pressure lines 17 or 61 and 18 or 62 already receiving similar pressure signals proportional to bank angle as controlled by the roll gyro, it was found that the directional signals were too large and too sensitive for the roll signal and required of the pilot altogether too much bank angle to correct a very small heading error. To obviate this difficulty, the directional signals desired had to be reduced in size before they were added to the roll signals. This was done effectively by reducing operation suction in the directional unit and by restricting the size of the directional signal pressure lines before they join the signal feeler pressure lines 17 or 61 and 18 or 62. When, for example, adjustments as described were made to provide a ratio of roll error to heading error of approximately 1:1 optimum conditions were achieved.

With such adjustment, recovery from a bank error as controlled by the signals at feeler not only brought the plane's wings level, but also brought the plane onto the reference heading. In steady flight in smooth air either with eyes closed or looking in directions not germane to the flight conditions, it was found that the heading could be held indefinitely within ¼° on the directional gyro. Establishment of a new heading after an index change, also, was easier (and without overshoot) using the signal feeler than by ordinary contact manual flight control.

Similar adjustments might have to be made if electrical signals are involved, rather than pneumatic signals. Likewise, when other parameters are utilized to actuate the signal feelers consideration must be given to the relative signal strengths available for each parameter, and appropriate adjustment must be made if relative strengths of signal are disproportional to eliminate masking difficulties such as those described. Of course if the parameter devices which control individual parameter signals which are to be added before reaching the signal feeler have characteristics which do not provide a predominant signal which masks all others, adjustments of the character just described need not be made before the addition of signals for delivery to the signal feeler.

The schematic systems shown in Figs. 9 and 10 provide generally for control of an airplane's direction by control of bank angle. Since directional and roll signals are added together it follows that a given heading error requires a compensating bank angle to provide signal equilibrium i. e., "no feel." In this way the bank angle is made proportional to the heading error and the airplane attains level flight when it is on the correct heading. This particular mode of control, however, is only one of those possible with signal feeler devices of the invention. Signal equilibrium or "no feel" could be made proportional to heading error and rudder position, equally as well or by other modes of control.

The feel signal imparted by the signal feeler device is one of a displacement of a knob or pin relative to a reference surface, i. e., a departure from a no feel condition of an element. The feel signal, however, can be other recognizable type of feel sensation, for example, heat, electric shock in which the heat or severity of shock could be controlled by pneumatic or electric systems such as have herein been described or in other ways.

The term space axes as employed herein and in the appended claims is intended to designate a radio defined flight path such, for example, as a localizer beam or glide path beam as well as the roll, pitch and yaw axes of a craft. The term attitude is also employed herein in a broad sense to include lateral displacement of the craft from a selected course or bearing or radio defined ground track as well as angular displacements of the craft about any of its axes such as the roll, pitch and yaw axes thereof. The term flight path as herein employed designates a path which may be defined by radio means, by a compass and by an altimeter and like instruments. Furthermore, it will be understood that by the term course we mean to designate either a radio defined course or a compass bearing. A gyro vertical may be employed to provide a reference in pitch and roll of the craft through the use of associated pick-offs on the roll and pitch axes thereof and a single gyro vertical, of course, may be employed for this purpose although the gyros in Figs. 8 and 9 have been indicated in the drawings as pitch and roll gyros. Obviously, a compass may be substituted for the directional gyro and in a complete system, but one directional gyro and vertical gyro may be employed to provide a tactile indication of any incorrect attitudes of the craft in pitch or roll. Moreover, various types of radio aids to navigation may be employed as a source of a radio error signal and the present invention is not to be limited to any particular source of radio error signal such as a radio glide path but other sources such as a localizer receiver, omni-directional range signals and high frequency radio beam signals may be employed.

While specific embodiments of the invention have been shown and described variations in practice within the scope of the claims are possible and are contemplated. There is no intention therefore of limitation to the exact details embodied herein.

What is claimed is:

1. In combination with a manual control means, an arrangement of measuring instruments for various conditions including computers, a feel imparting signalling means, and means connected to said control means responsive to measurements of the measuring instruments and any of the computers and to the position of the condition control means for actuating the feel imparting means relative to said control means to indicate direction and amount of error in position of the controlling means from the position intended for best control as determined by the measurements of the measuring instruments and any of the computers.

2. In combination with a control device, means for measuring error, a signal feeler means connected to said control device and having a feel imparting member and means responsive to measuring error and to the condition of the control device for operating the feel imparting member of said signal feeler relative to said control device whereby the control operation of the control device is effected by moving the control device to follow the feel of said feel imparting member in a direction indicated by the feel of said feel member to restore it to a "no feel" position.

3. In combination with a parameter control device, a parameter measuring instrument connected to said control device, a signal feeler instrument and means including a position follow-up arrangement connecting the parameter control device and the parameter measuring instrument for operating said signal feeler instrument to provide signals that are functions of the position of the control device and the parameter measurement of the measuring instrument.

4. A feeler type navigational craft controller comprising a tactile indicating means, means for defining reference axes in space, a plurality of means for providing a plurality of signals dependent respectively upon deviations in craft attitude relative to different ones of said spaced defined axes, and means for operating said tactile indicating means relative to said controller in direction and amount proportionally to a function of said signals.

5. A feeler type navigational craft controller comprising a tactile indicating means, flight path-defining means including means for providing a signal proportional to the deviations of said craft relative to the flight path so defined, means for defining a reference axis in space including means for supplying an attitude signal proportional to angular deviations of the craft from the axis so defined, and means for operating said indicating means relative to said controller proportionally to a function of said signals.

6. A feeler controller for dirigible craft comprising a tactile indicating means, course-defining means including means for supplying a signal proportional to deviations of the craft relative to the selected course, means for defining a reference axis in space including means for supplying an attitude signal proportional to angular deviations of the craft from the axis so defined, and means for operating said indicating means proportionally to the algebraic sum of said signals.

7. A feeler type controller for dirigible craft comprising a tactile indicating means, flight path defining means including means for providing signals proportional to deviations of the craft from the flight path so defined, a vertical reference device and means associated therewith for providing a signal proportional to deviations in roll attitude of the craft from straight and level flight, and means for operating said indicating means in direction and amount proportionally to the algebraic sum of said signals.

References Cited in the file of this patent

UNITED STATES PATENTS

| Number | Name | Date |
| --- | --- | --- |
| 2,029,700 | Boykow | Feb. 4, 1936 |
| 2,078,982 | Stark | May 4, 1937 |
| 2,094,001 | De Florez | Sept. 28, 1937 |
| 2,148,471 | Jones | Feb. 28, 1939 |
| 2,389,204 | Ludi et al. | Nov. 20, 1945 |